Dec. 17, 1957   R. L. JAESCHKE   2,817,029
MOTOR-DRIVE COUPLING UNIT
Filed March 12, 1956   2 Sheets-Sheet 1

Ralph L. Jaeschke,
Inventor,
Koenig and Pope
Attorneys

Dec. 17, 1957  R. L. JAESCHKE  2,817,029
MOTOR-DRIVE COUPLING UNIT
Filed March 12, 1956  2 Sheets-Sheet 2

Ralph L. Jaeschke,
Inventor.
Koenig and Pope,
Attorneys.

2,817,029
MOTOR-DRIVE COUPLING UNIT

Ralph L. Jaeschke, Kenosha, Wis., assignor to Eaton Manufacturing Company, Cleveland, Ohio, a corporation of Ohio Application March 12, 1956, Serial No. 571,052

6 Claims. (Cl. 310—96)

This invention relates to a motor-drive coupling unit, and more particularly to a variable coupling unit of this class which is an improvement upon the unit shown in my United States Patent 2,723,356, dated November 8, 1955.

Among the several objects of the invention may be noted the provision in an assembly of a motor drive with an electromagnetic variable coupling including a control generator, the coupling having a fixed exciter coil; the provision of a unit of the class described providing improved air-circulation for cooling the coupling elements, the motor, the control generator and the bearings therefor; and the provision of a reliable and compact assembly of this class requiring no slip rings or the like for current conduction. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, Fig. 1 is an axial section of the unit;

Corresponding reference characters indicate corresponding parts throughout the several views of the drawings.

Figure 1:
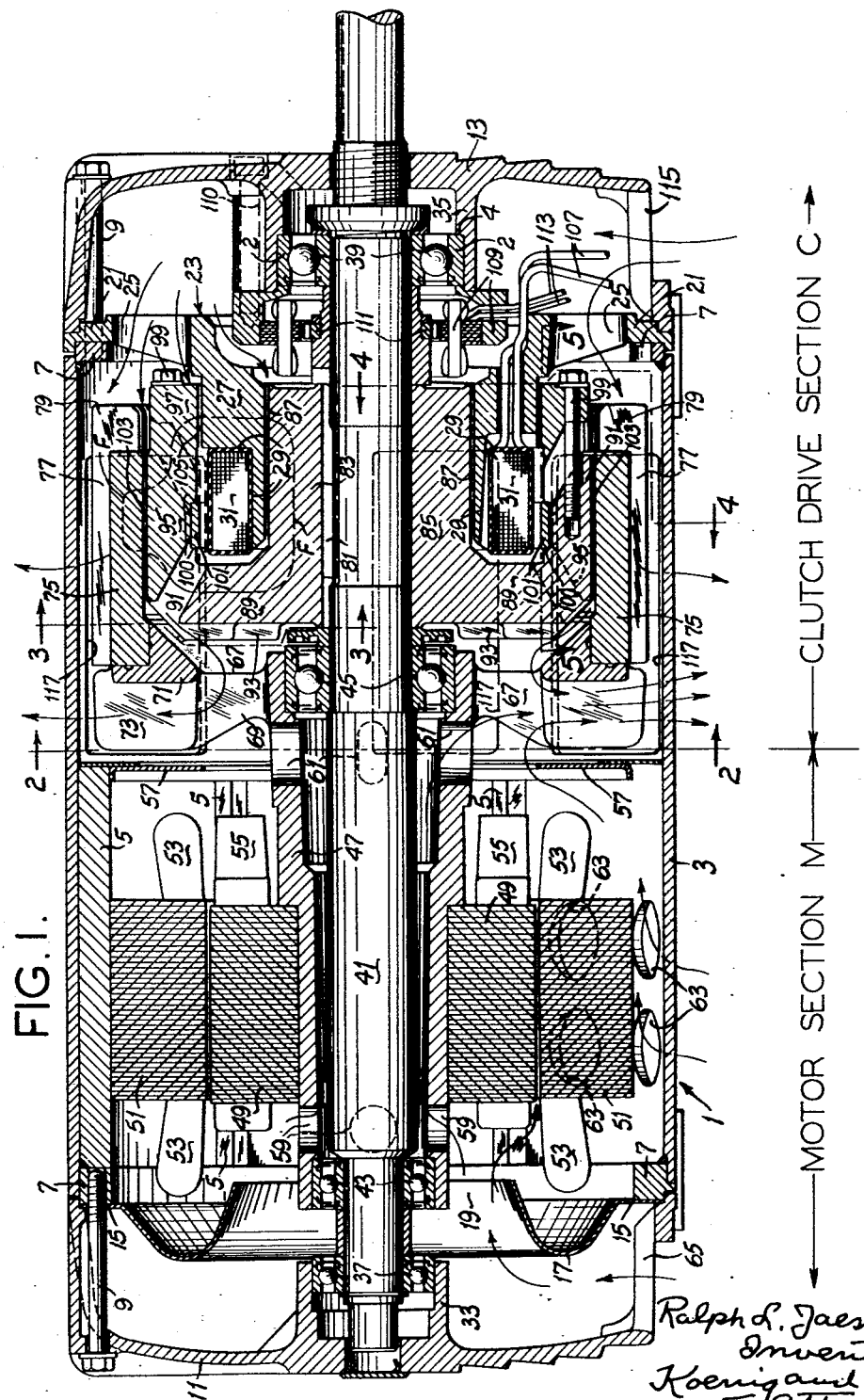
Figure 2:
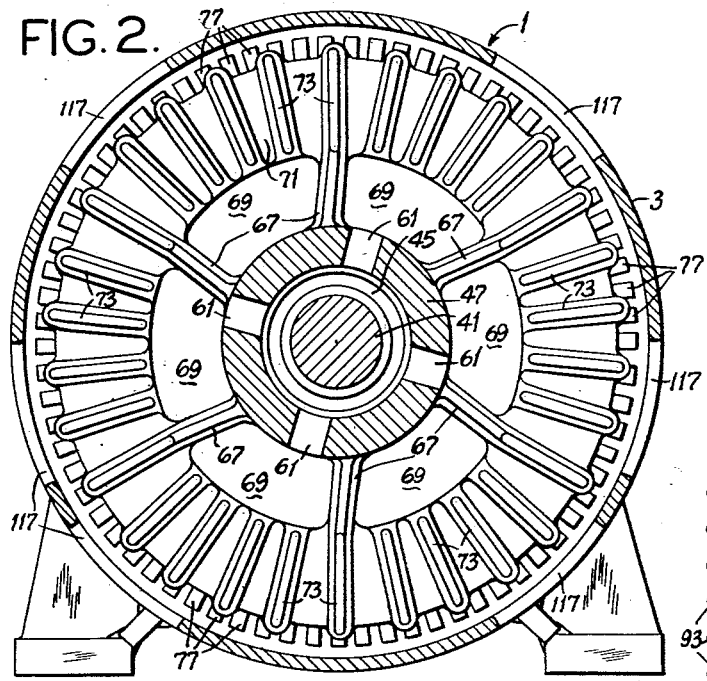
Fig. 2 is a cross section taken on line 2—2 of Fig. 1.

Referring now more particularly to the drawings, there is shown at M a motor section and at C a clutch drive section. At numeral 1 is shown a casing, consisting of a central sleeve 3 in the left-hand portion of which is located a group of ribs or lands 5. Attached to the ends of the sleeve 3, as by welding, are collars 7 containing threaded openings for accepting holding bolts 9. At the left-hand end of the machine a group of the bolts hold an end bell 11 and at the right-hand end of the machine another group holds an end bell 13. End bell 11 clamps the marginal flange 15 of a septum 17 formed with a central nozzle portion 19. The end bell 13 clamps the marginal flange 21 of a spider 23 having spokes providing openings 25. The spokes are joined with a magnetizable (iron, for example) central sleeve 27. This sleeve or hub is provided with a shouldered recess 29 for the reception of an annularly wound field coil 31 which is thus carried upon the sleeve 27.

The end bells 11 and 13 include central sleeves 33 and 35, respectively, which support bearings 37 and 39, respectively. These bearings 37 and 39 in turn support a driven shaft 41. The shaft 41 carries bearings 43 and 45, which in turn carry a surrounding hollow quill 47. The quill 47 supports a rotor 49 of a motor, the stator 51 of which is carried on the ribs 5 within the sleeve 3. The septum 17 is peripherally shaped to clear the windings 53 of the stator. The rotor includes fins 55 on the right side of the stator 51. The sleeve 3 carries an annular septum 57 adjacent the fins 55. The quill 47 has air-inlet openings 59 on the left side of the motor elements 49 and 51. On the right side of the quill are air outlets 61 which are approximately in the plane of the septum 57. The nozzle 19 directs air toward the rotor 49 and inlets 59. Lower air inlet openings 63 are provided in the sleeve 3 adjacent the stator 51 and an inlet opening 65 is provided at the bottom of the end bell 11.

The right-hand end of the quill 47 has spokes 67, providing openings 69 therebetween and supporting a rim 71, the latter being provided with fan blades 73. Rim 71 has press-fitted thereto a magnetizable (iron, for example) inductor drum 75, provided with outside ribs 77 and axial fins 79. The inner surface of the drum 75 is uninterruptedly cylindric, being spaced from the outside of the exciter coil 31. The exciter coil is also spaced from the shaft 41.

Figure 5:
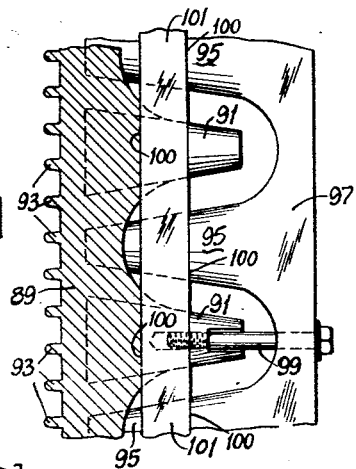
Figure 3:
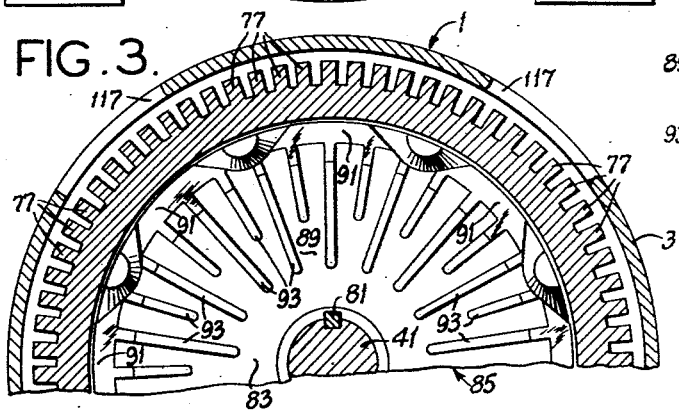
Fig. 3 is an upper half transverse section taken on line 3—3 of Fig. 1.
Figure 4:
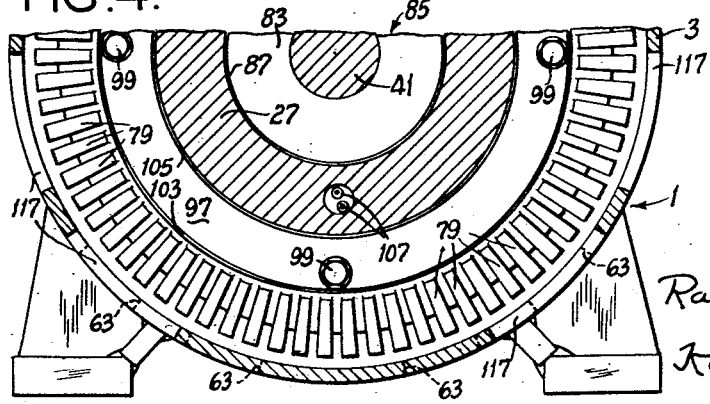
Fig. 4 is a lower half jogged transverse section taken on line 4—4 of Fig. 1; and, Fig. 5 is a fragmentary developed view taken on line 5—5 of Fig. 1.

Keyed to the shaft, as at 81, is a magnetizable (iron, for example) hub portion 83 of a field member designated 85 in general. The inside of the sleeve 27 and the outside of the hub 83 are uninterruptedly cylindrical, thus providing a smooth magnetic gap 87 on the right-hand side of the exciter coil 31. On the left-hand side of the coil the hub 83 is formed as a ring 89, from which pole-forming magnetizable teeth 91 extend axially between the inductor drum 75 on the one hand, and coil 31 on the other hand. At the connection between the teeth 91 and the ring 89 are ribs 93. As shown in Fig. 5, the teeth 91 spacedly interdigitate with pole-forming teeth 95. Magnetizable teeth 95 extend axially between the drum 75 on the one hand, and the coil 31 and sleeve 27 on the other hand. The teeth 95 extend from a magnetizable ring 97, surrounding the sleeve 27. A plurality of nonmagnetizable bolts 99 hold the ring 97 in assembly with ring 89, and also clamp a nonmagnetizable ring 101 between seats 100 under the teeth 91 and 95. The outer surfaces of the teeth 91 and 95 are cylindrically machined, to provide an outer magnetic gap 103.

The outer surfaces of the sleeve 27 and the inner surface of the ring 97 are uninterruptedly cylindrical, thus providing an intermediate smooth magnetic gap 105. This gap is outside of and in the plane of the smooth gap 87 to the right of coil 31. Thus when the coil 31 is excited, as from a supply line 107, a toroidal magnetic field surrounds coil 31, an axial section of which is illustrated by the dashline loop F. This loop F interlinks sleeve 27, gap 87, hub 83, ring 89, teeth 91, gap 103, inductor drum 75, reversely through gap 103, and teeth 95, returning to ring 97 through gap 105. The teeth 91 and 95 polarize the toroidal field of which loop F is an element, so that flux concentrations may sweep the inductor drum 75 at gap 103. However, no flux concentrations sweep the gaps 87 and 105, because these are cylindrically uninterrupted and smooth.

The sleeve 35 of end bell 13 carries on its end the stator 109 of an A. C. permanent pole generator, the permanent poles 111 of which are attached to the shaft 41. Fastening bolts therefor are shown at 110. Part of the output circuit of the generator is indicated by the wires 113. Wires 107 and 113 may be led out through lower air inlet opening 115 in the end bell 13. In the sleeve 3, adjacent the ribs 77, are air exit openings 117.

The outer race 2 of the bearing 39 is held in place in sleeve 35 by the stator 109, being seated on a shoulder 4, as shown.

Operation is as follows:

Assume that shaft 41 is coupled at the right to a suitable load (not shown) and that the coils 53 of the motor stator 51 are excited. This rotates the motor rotor 49 and therefore the quill 47 and inductor drum 75. Upon exciting the coil 31, a toroidal field will surround it, looped as indicated at F. The strength of this field, and accordingly the polar concentrations through the gap 103, increase according to the strength in ampere turns of excitation. Since there will be relative motion between the drum 75 and the poles 91, 95, concentrations of flux will sweep through the inductor 75. These generate eddy currents which in turn generate flux fields which are reactive with respect to the flux field from the poles. The result will be a rotary acceleration of the assembly 83, 89, 91, 95, 97 and of the shaft 41 with its load. At the same time, the generator 109, 111 will produce an output over circuit 113, the value of which accords to speed. The circuits 107, 113 are connected through a suitable control circuit which is not shown, since it forms no part of the present invention per se. Under certain conditions of load and relative speeds between shaft 41 and quill 47, steady-state conditions will be reached, under which a steady drive occurs with some rotary slip between the driving and driven members.

The improved arrangement provides very effective cooling as follows: The blades 73 and ribs 77 drive air outward by centrifugal force through the openings 117. This induces air flow through the inlets 63, 65 and 115. Air entering the inlet 65 is directed through the nozzle 19 to openings 59 and to the gap between the motor rotor 49 and stator 51. In passing nozzle 19, it cools the bearings 37 and 43. Some of it, entering the openings 59, passes through the quill 47, to escape at the openings 61. This cools the rotor 49 and bearing 45. Part of the air that does not go through the quill may also flow around the stator 51 between ribs 5. Additional amounts of air are drawn around the stator through the inlet 63. The fins 55 tend to radiate heat from the rotor into the air stream. Part of the stream passes through the central opening in the septum 57. The above-described air flow is shown by curved darts.

Another stream of air enters the opening 115 in the end bell 13. This flows around the bearing 39 and generator 109, 111, some passing through the gap of the latter. Part of the flow finds its way through the gap 87, then between teeth 91, 95 and openings 69 to the fan blades 73. Another part of this air passes through the openings 25 and around the inductor 75. The fins 79 act as radiators of heat from the inductor into the air stream, and so do the ribs 77, the latter also acting as fan blades. Some of the air that enters through the openings 25 also is induced to flow through the gap 105 (over coil 31) and some also passes through the gap 103. This air also finds its way to the openings 69 and is slung out by the fan blades 73.

Among the advantages are that the fixed field coil 31 on the extension from the open spider 23, surrounded by the field member having the open-work C-shaped axial section constituted by parts 83, 89, 91, 95 and 97 (see Fig. 5), provides very efficient air-cooling, besides eliminating the requirement for slip rings. Moreover, the location of the generator 109, 111 and the bearing 39 on sleeve 35 results in efficient cooling of these parts by the air stream flowing around the sleeve 35. The nozzle 19 directs air from the other end of the machine centrally where needed, to enter the quill ports 59 and motor gap, air also being provided around the stator. Thus the machine is of very compact mechanical form; is highly efficient electrically; and is very effectively cooled, even though its exciter coil is stationary. It is to be noted that the exciter coil 31 has air flowing not only over its outside but also through it by way of gap 87.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. An electromagnetic coupling device comprising an annular stationary field coil, a spider having a magnetizable hollow hub extending therefrom and supporting said field coil, said spider having openings therein on one side of the field coil, a magnetizable annular rotatable assembly having a generally C-shaped axial half section enveloping but spaced from said field coil and hub, said assembly having interdigitated magnetic pole members outside of said coil, a shaft driven by said assembly, a magnetizable inductor drum surrounding said C-shaped assembly and being rotatable on said shaft, a casing having an outlet opening and surrounding the inductor on one side of said spider and a hollow end bell extending therefrom on the other side of the spider, said end bell having an air inlet opening on said other side of the spider, and means supporting the inductor adapted to induce air flow from said inlet opening of the end bell through the openings in said spider and also through said hub and C-shaped assembly to said outlet opening in the casing.

2. An electromagnetic coupling device made according to claim 1, including a sleeve within said end bell, said sleeve carrying a stator of a generator which has a rotor on the shaft, said generator being located by the sleeve so that air flowing through said end bell traverses the generator.

3. An electromagnetic coupling device made according to claim 1, including a sleeve within said end bell, a bearing for said shaft within said sleeve, said sleeve carrying a stator of a generator which has a rotor on the shaft, said bearing and generator being located by the sleeve so that air flowing through said end bell cools the bearing and the generator.

4. A motor-drive electromagnetic coupling unit comprising a housing forming a motor section and a clutch section separated by an annular septum, said housing having first and second end bells on the motor and clutch sections respectively, a stationary field coil in the clutch section, a spider having a magnetizable hollow hub extending therefrom and supporting said field coil, said spider having openings therein on one side of the field coil, a magnetizable annular rotatable assembly having a C-shaped axial half section enveloping but spaced from the field coil and said hub, said assembly having magnetically separated interdigitated pole members outside of said coil, a shaft driven by said assembly, bearings in said end bells supporting said shaft for rotation, a magnetizable inductor drum surrounding said C-shaped assembly, said inductor being located in the clutch section, said second end bell having an air inlet on one side of the spider, said casing having air outlet openings on the other side of the spider, said inductor having fan blades within the outlet openings in the casing, a stator mounted spacedly from the casing in the motor section, a hollow rotary quill borne on said shaft, spokes having openings therebetween supporting the inductor on the quill, a rotor on the quill in the motor section, air-circulating inlet and outlet openings in the quill on opposite sides of the rotor, a septum separating the space in the housing containing the stator and rotor from the first end bell, said first end bell having an air-inlet opening and said septum having a central nozzle adapted to direct air inward toward said inlet openings in the quill and the space between the stator and the rotor.

5. A motor-drive electromagnetic coupling unit made according to claim 4, including heat-radiating fins on the rotor and on the inductor drum.

6. A motor-drive electromagnetic coupling unit made according to claim 4, wherein said second end bell includes a sleeve containing a bearing for said shaft and supporting a stator of a generator, the rotor of said generator being located on said shaft adjacent the generator stator, whereby air flow induced by the blades on the inductor is drawn through the second end bell over said sleeve, through the openings in said spider and through said hollow hub and C-shaped assembly and inductor, and whereby air is drawn into the opening of said first end bell to enter and pass through said motor section by way of said nozzle.

References Cited in the file of this patent
UNITED STATES PATENTS

| | | |
|---|---|---|
| 1,525,691 | Poth | Feb. 10, 1925 |
| 2,411,791 | Fell | Nov. 26, 1946 |
| 2,630,466 | Landis | Mar. 3, 1953 |